(12) United States Patent
Corral

(10) Patent No.: US 6,925,128 B2
(45) Date of Patent: Aug. 2, 2005

(54) METHOD AND APPARATUS FOR REDUCING A PEAK-TO-AVERAGE POWER RATIO IN AN ORTHOGONAL FREQUENCY DIVISION MULTIPLEX SIGNAL

(75) Inventor: Celestino A. Corral, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 387 days.

(21) Appl. No.: 10/284,927

(22) Filed: Oct. 31, 2002

(65) Prior Publication Data

US 2004/0086054 A1 May 6, 2004

(51) Int. Cl.[7] .......................... H01K 1/10; H04L 27/28
(52) U.S. Cl. ..................... 375/260; 375/295; 370/208
(58) Field of Search ........................ 375/260, 261, 375/295, 346; 370/208, 210, 203; 455/296

(56) References Cited

U.S. PATENT DOCUMENTS

| | | | | |
|---|---|---|---|---|
| 5,862,182 | A | 1/1999 | Awater et al. ............... | 375/279 |
| 6,005,840 | A | 12/1999 | Awater et al. ............... | 370/206 |
| 6,192,068 | B1 | 2/2001 | Fattouche et al. .......... | 375/200 |
| 6,314,146 | B1 * | 11/2001 | Tellado et al. .............. | 375/346 |
| 6,373,859 | B1 | 4/2002 | Jedwab et al. .............. | 370/479 |
| 6,512,797 | B1 * | 1/2003 | Tellado et al. .............. | 375/261 |
| 2001/0022777 | A1 * | 9/2001 | Bourget et al. ............. | 370/210 |
| 2002/0061068 | A1 * | 5/2002 | Leva et al. .................. | 375/260 |
| 2002/0150036 | A1 * | 10/2002 | Weerackody ................ | 370/208 |
| 2002/0168013 | A1 * | 11/2002 | Attallah et al. ............. | 375/259 |
| 2003/0067866 | A1 * | 4/2003 | Jung ........................... | 370/210 |
| 2003/0133433 | A1 * | 7/2003 | Cimini et al. ............... | 370/342 |
| 2004/0008616 | A1 * | 1/2004 | Jung et al. .................. | 370/203 |
| 2004/0141458 | A1 * | 7/2004 | Park et al. ................... | 370/208 |

FOREIGN PATENT DOCUMENTS

EP 000702466 A2 * 3/1996

* cited by examiner

*Primary Examiner*—Temesghen Ghebretinsae
(74) *Attorney, Agent, or Firm*—Posz & Bethards; Charlie W. Bethards

(57) ABSTRACT

An apparatus and method therein for reducing a PAPR in an OFDM signal includes: a reorderer (104) that reorders (706) a plurality of elements of an original frequency-domain input vector in a predetermined manner to create a plurality of candidate input vectors; a Fourier processor (108) that performs (708) an inverse Fourier transform on the candidate input vectors to obtain a corresponding plurality of approximating OFDM outputs; a comparator (114) that compares (710) samples of each of the approximating OFDM outputs with corresponding samples of a target output signal; and an output selector (110) that chooses (712) a desired output signal from the approximating OFDM outputs, in response to a comparison of the samples.

24 Claims, 3 Drawing Sheets

US 6,925,128 B2

METHOD AND APPARATUS FOR REDUCING A PEAK-TO-AVERAGE POWER RATIO IN AN ORTHOGONAL FREQUENCY DIVISION MULTIPLEX SIGNAL

FIELD OF THE INVENTION

This invention relates in general to wireless data communication systems, and more specifically to a method and apparatus for reducing a peak-to-average power ratio in an orthogonal frequency division multiplex signal.

BACKGROUND OF THE INVENTION

Orthogonal frequency division multiplex (OFDM) is a multi-carrier signal generation method whereby data are sent simultaneously over N equally spaced carrier frequencies using Fourier transform techniques for modulation and demodulation. By proper choice of frequencies, OFDM can squeeze multiple modulated carriers into a prescribed band while preserving orthogonality to eliminate inter-carrier interference (ICI). When compared to single-carrier modulation, OFDM has some distinct advantages.

Unfortunately, in the OFDM signal, the constructive summation of N sinusoidal carriers can result in peak envelope power that is as much as N times the mean envelope power for unencoded signals. A large peak-to-average power ratio (PAPR) necessitates the use of linear amplifiers, which are inefficient. Furthermore, the amplifiers must typically be run at some back-off from compression in order to reduce the distortion introduced by clipping, further reducing efficiency. Amplifier back-off attenuates the transmitted signals, thereby placing greater demands on receiver sensitivity.

Thus, what is needed is a method and apparatus for reducing PAPR in an OFDM signal. Preferably, the method and apparatus will reduce the PAPR substantially, while minimizing the computational complexity required to achieve the reduction.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE PREFERRED EMBODIMENT

Figure 1:
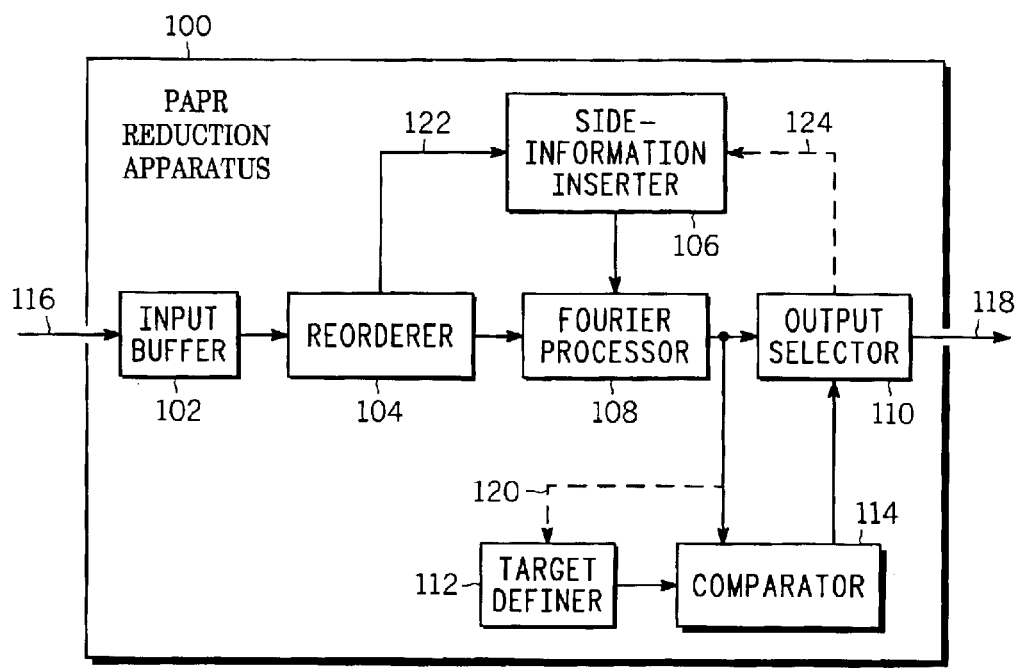
FIG. 1 is an electrical block diagram of an exemplary embodiment of an apparatus for reducing a peak-to-average power ratio.

In overview form the present disclosure concerns communications systems that utilize transmitters to provide service for wireless communication devices. More particularly, various inventive concepts and principles embodied as methods and apparatus for reducing a peak-to-average power ratio in an orthogonal frequency division multiplex (OFDM) signal for use in equipment within such communications systems will be discussed and disclosed. The communications systems of particular interest are those being deployed and developed, such as digital audio and digital video wireline broadcasting; wireless local area networks (WLAN) such as 802.11a in the United States and ETSI BRAN HiperLAN/2 in Europe; wireless metropolitan area networks (WMAN); powerline communications (Homeplug); and systems and evolutions thereof that utilize OFDM signals, although the concepts and principles have application in other systems and devices.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit the invention in any manner. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in one or more conventional digital signal processors (DSPs), or with integrated circuits (ICs) such as custom or application specific ICs. It is expected that one of ordinary skill, notwithstanding possibly significant effort and many design choices motivated by, for example, available time, current technology, and economic considerations, when guided by the concepts and principles disclosed herein will be readily capable of programming such DSPs, or generating such ICs with minimal experimentation. Therefore, in the interest of brevity and minimization of any risk of obscuring the principles and concepts according to the present invention, further discussion of such DSPs and ICs, if any, will be limited to the essentials with respect to the principles and concepts employed by the preferred embodiments.

Prior to describing the preferred embodiments in detail, it will be beneficial to develop some common language and concepts in the field by reviewing briefly various known techniques utilized for reducing the peak-to-average power ratio (PAPR) of an orthogonal frequency division multiplex (OFDM) signal, along with the drawbacks of such techniques. OFDM is a multi-carrier signal generation method whereby data are sent simultaneously over N equally spaced carrier frequencies using Fourier transform techniques, e.g., inverse fast Fourier transform (IFFT) or inverse discrete Fourier transform (IDFT) for modulation, and Fast Fourier transform (FFT) or Discrete Fourier transform (DFT) for demodulation. One of the major drawbacks of OFDM is that the constructive summation of N sinusoidal carriers can result in peak envelope power that is as much as N times the mean envelope power for unencoded signals. The peak-toaverage power ratio (PAPR) is the ratio of the supremum of the signal to its mean, $$PAPR = \frac{\max|f|^2}{E\{|f|^2\}} \quad (1)$$

where f is the OFDM symbol and E{.} is the expectation operator.

Due to the importance of PAPR in OFDM transmissions, a considerable amount of research has been dedicated to this topic and various techniques have been developed. These techniques can be subdivided into the following generic categories:

1. Signal manipulation—This constitutes operations performed after the inverse discrete Fourier transform (IDFT) and up to the antenna. These operations include clipping, filtering, pulse shaping and amplifier adjustment techniques.

2. Modulation manipulation—This encompasses all operations performed from the encoded data to the IDFT block. This includes phase rotations of the modulation and related functions.

3. Coding—This is the portion of the system that converts raw data to encoded data with the explicit purpose of reducing PAPR. Some codes can be chosen that have error detection/correction capability in addition to PAPR control.

Signal Manipulation

Clipping represents both an opportunity and a detriment in OFDM signal transmission. Uncontrolled signal clipping (such as that caused by an overdriven amplifier) causes in-band distortion, which cannot be reduced by filtering and is the main cause of BER degradation. One option is to intentionally clip the signal to a desired level prior to transmission. Digital clipping carried out on an oversampled version of the digital signal reduces overshoot in the digital-to-analog converter (DAC) but causes spectral spreading that must be subsequently filtered.

OFDM signals are similar to speech in the sense that large peaks occur infrequently. Using this fact, a $\mu$-law companding technique was introduced in the prior art to reduce PAPR, resulting in a reduction of approximately $\sqrt{N}$. However, some deficiencies in the analysis were noted leading to the realization that companding also produces spectral splatter and symbol error rate (SER) improvement only at high SNR. More recently, an A-law companding technique was introduced resulting in improved SER performance for large N over the uncompanded case.

Pulse shaping is an approach whereby time-limited (windowed) waveforms are applied on the different subcarriers to reduce PAPR and improve the OFDM power spectrum. This technique does not require additional computation and can improve OFDM spectral efficiency. However, pulse shaping introduces ICI (Inter Channel Interference), which, while controlled, requires optimum detectors. In addition, pulse shaping can introduce discontinuities between consecutive blocks of cyclic-extended OFDM signals.

Other signal manipulation schemes have been proposed. In one scheme the large peak is canceled through the subtraction of a reference function from the transmitted signal. An "anti-peak" signal is generated and summed to the original signal for the method advanced in another scheme. The potential issue with these techniques is the issue of resolution for the reference or anti-peak signals, and the complexity of the techniques involved.

Modulation Manipulation

Modulation is the mapping of the digital data to the complex symbol input to the IDFT block. At this level, phase shifts of the complex symbol can result in PAPR reduction. A "pre-whitening" technique has been described for both PAPR reduction and security. The added feature of securing the transmission is an advantage that can be exploited in such implementations.

Partial transmit sequences (PTS) and selective mapping (SLM) approaches have been proposed based on the phase shifting of sub-blocks of data symbols and the multiplication of the data frame by random vectors. While not coding per se, PTS and SLM implement some form of near random behavior in the modulation that appears like a code. In PTS, the input data frame is partitioned into sub-blocks, each sub-block phase shifted by a constant factor to reduce PAPR. The optimization of the phase to achieve lower PAPR is a highly non-linear problem so that other approaches have concentrated on reducing computational complexity.

For the SLM approach, the input data frame is multiplied by random sequences and the resultant sequence with the lowest PAPR is then selected for transmission. To enable the receiver to recover the data, a pointer to the multiplying sequence can be transmitted as "side information." Like PTS, SLM optimization is difficult and considerable effort has been dedicated to the reduction of computational load.

Another alternative is "tone injection" whereby the symbol constellation is extended such that the same data point corresponds to multiple possible constellation points. Unlike SLM and PTS, no side information needs to be sent, as the receiver only needs to map the redundant constellations on the original one. However, the technique is extremely complex. An iterative approach has also been proposed that can result in adequate PAPR reduction with lower computational costs.

Coding

Coding represents a manipulation of the data to enhance its robustness against certain types of errors. Within the scope of coding we also treat interleaving, which adds to the robustness of the code without increasing redundancy.

Block interleaving is commonly used in many applications including HiperLAN/2 and 802.11a. Interleaving has also been considered for the reduction of PAPR in OFDM transmissions. One technique has proposed random interleaving with oversampling and then selection of the interleave that produces the minimum PAPR. The notion that highly correlated data frames have large PAPR and can therefore be reduced if the long correlation pattern is broken down has also been discussed. PAPR reduction using random interleaving produces moderate results. In addition, interleaving for handling bursty errors cannot be done here, as that degree of freedom has been used to reduce PAPR.

Codes, unlike interleaving, add overhead to the data to perform bit error detection and correction. A simple known method uses block coding to transmit across the carriers only those polyphase sequences with small PAPR. As originally proposed, the method requires large look-up tables for encoding and decoding along with an exhaustive search to identify the best sequences. Simpler implementations have somewhat alleviated the complexity. For example, an ordered statistic-decoding algorithm was proposed which further reduces the complexity of these techniques. Nonetheless, it is generally agreed that these methods do not lend themselves to the selection of optimal codes with minimal PAPR in a structured way.

Yet another method is a technique whereby code words are drawn from an additive offset of some linear code. The linear code is selected for its error correcting properties and the offset to reduce the PAPR. The offset selection problem is quite difficult and requires extensive computations. This has led to refinements in which a geometrical method reduces the computational load making use of a maximum-likelihood decoder for the underlying code to find good offsets.

Coding, combined with clipping, can offer some advantages in terms of reducing hardware complexity for PAPR reduction. With coding it is possible to completely eliminate the complexity associated with oversampling and perform direct clipping and filtering on the strictly band-limited OFDM signal. Here, an adaptive symbol selection scheme is needed that marginally increments implementation complexity. It has been shown that the average channel capacity of clipped coded OFDM rises in a non-linear fashion as clipping ratio rises and that oversampling has little impact on potential performance. However, results using these approaches tend to be modest.

A recent work developed a powerful theory, which yields a class of codes enjoying PAPR as low as 2, large minimum distance, and possessing efficient soft-decision decoding algorithms. These codes are formed from unions of cosets of the classical Reed-Muller codes and new generalizations of them.

Various patents deal with the application of complementary codes to OFDM transmissions and these include U.S. Pat. No. 5,862,182 to Awater et al., U.S. Pat. No. 6,373,859 to Jedwab et al., and U.S. Pat. No. 6,005,840 to Awater et al. Despite the wealth of research into complementary codes for OFDM signals, their implementation is not popular. On the one hand, the codes are not effective for error correction for $N \geq 32$, excluding them from wireline and other systems in which a larger number of subcarriers are used. On the other hand, they are well suited for constant energy signals but do not provide significant improvements for non-constant energy signals that are prevalent in many OFDM systems for achieving higher data rates. Complementary codes also preclude the use of stronger codes, and are not amenable to existing implementations with tracking pilots.

In summary, known probabilistic techniques operate as $$Y_n = A_n X_n + B_n, \quad 1 \leq n \leq N \quad (2)$$

where Y is the input vector of the IFFT, $X_n$ are elements of the original frequency domain data vector X, and the goal is to find the N-point vectors A and B with elements $A_n$ and $B_n$ respectively, such that the transmit symbol y=IFFT(Y) has a small probability of peaks. Selective mapping (SLM) and partial transmit sequences operate on A through phase rotations. Tone injection (or tone reservation) optimizes B as a translation vector by extending the symbol constellation such that the same data point corresponds to multiple possible constellation points. While in the tone injection technique no extra side information is needed, the optimization is extremely complex and iterative. In addition, the alternative constellation points have increased energy compared to the original ones.

At this point given the concepts and language developed above relative to techniques for PAPR reduction in OFDM signals, a discussion and description of the details of several embodiments for advantageously reducing PAPR and the inventive principles and concepts thereof will be undertaken. The investigation for a novel and advantageous technique for reducing PAPR, was motivated by concerns and observations, such as one or more of the following non limiting list:

1. The technique should be general.
2. The technique should be applicable to existing implementations including standards. This means the technique should be independent of the source coding, modulation employed, and pilot insertion as one or more of these have been specified by various standards.
3. The technique should support multiple degrees of freedom that can be employed to reduce the number of computations or processing load and enhance security.

The known methods described herein above have failed in one or more of these requirements and led to a need for a new approach in accordance with the preferred embodiments. The novel approach presented herein may be viewed as a probabilistic technique whereby the symbol placement (i.e., subcarrier assignment) is manipulated to achieve the PAPR reduction.

Again referring to equation (2), the instant approach employed by one or more embodiments is the modification of $X_n$ directly, but the approach also allows for the manipulation of $A_n$ and $B_n$. Initially, $X_n$ could be simply a rotation of the data vector $s_i(p)$, $i=1, 2, \ldots N$, resulting in a circulant matrix, which reduces the IDFT process to a circular convolution.

$$C(p) = \begin{pmatrix} s_1 & s_2 & s_3 & \cdots & s_N \\ s_N & s_1 & s_2 & \cdots & s_{N-1} \\ \vdots & \vdots & \vdots & \vdots & \vdots \\ s_2 & s_3 & s_4 & \cdots & s_1 \end{pmatrix} \quad (3)$$

This exploits the computational efficiency of such a technique such that the number of computational operations advantageously is less than a standard matrix multiply (i.e., $O(N^2 \log_2(N))$ as opposed to $O(N^3)$).

In addition, if a sliding window on the data is imposed, a Toeplitz matrix structure results, which can also be exploited in circular convolution through proper matrix manipulations. In greater detail, the original modulated data is "scanned" within a window of appropriate length up to the desired depth. This scanning results in a serial shift of the symbols as opposed to a cyclic shift. The new matrix structure is now Toeplitz:

$$T_N = \begin{pmatrix} s_1 & s_2 & s_3 & \cdots & s_N \\ s_{-1} & s_1 & s_2 & \cdots & s_{N-1} \\ \vdots & \vdots & \vdots & \vdots & \vdots \\ s_{-N} & s_{-N+1} & s_{-N+2} & \cdots & s_1 \end{pmatrix} \quad (4)$$

The Toeplitz structure can also be implemented in a circular convolution as described in P. J. Davis, *Circulant Matrices*, New York: Chelsea Pub., 1994.

An issue with the serial shift of the symbols is that for some shift k a portion of the data is removed from the original stream. Interleaving (if used) advantageously is not affected because the symbols are rolled on a first-in first-out (FIFO) basis. The missing data must be sent in a separate transmission and reconstructed at the receiver. A way to address this is to apply the serial shifting and the cyclic shifting on alternating symbols. The process is described as follows:

1. "Scan" the data resulting in a Toeplitz structure that can be implemented as a matrix-matrix multiply operation with the IDFT.
2. Pick the result with the closest approximation to the target (as discussed herein below), and transmit, adding the side information as the data shift $k_T$. (Receiver demodulates the data directly, stores $k_T$.)
3. Take the last $k_T-1$ symbols and append them to the new data stream to obtain a new symbol stream of length N.
4. Perform the cyclic shift operation on the resultant symbol stream. The new side information is $k_C$. (Receiver demodulates the data, uses $k_C$ to recover the original stream. The receiver then takes the last $k_T-1$ symbols and appends to the previously received stream, thereby reconstructing the original data stream.)

5. Go to step 1 for the next blocks of symbols.

This principle can be extended to other matrix structures that can be fit into the circular convolution concept. Consequently, it is possible to reduce the number of computations given the manipulation of the data ordering.

It is worth noting that the side information occupies a predetermined number of subcarriers, which must also be processed by the IDFT. The side information can be placed anywhere in the band of the OFDM spectrum. This fact can be used to provide a layer of security, as the side information can be pseudo-randomly placed in different slots. The side information can also be treated as a type of tone injection technique that can be used for PAPR reduction. In this case, the side information itself preferably is a waveform with low PAPR, which, after the IDFT process, is added to the output signal. The side information subcarriers can be randomly placed. In the preferred embodiment, however, the side-information subcarriers are contiguous and are placed at predetermined slots within the OFDM band. This approach advantageously allows for the definition of "target" side information that can further reduce the PAPR.

To achieve all of the stated objectives, the preferred approach is to consider the OFDM symbol generation as an approximation to a desired output signal. The desired (or target) output should have the following properties:

1. The output should have an acceptably low PAPR, e.g., less than 2.0.
2. The function should be periodic in a window over which the PAPR is specified. The PAPR can be specified over the entire OFDM symbol width or over a defined portion of the symbol.
3. The function should be smooth so that no large errors (peaks) occur near the transitions at the window edges.

The approximation can extend over the entire symbol window of the OFDM signal, or over defined portions of the symbol window. This allows the use of weighted approximations or approximations in the defined portions, thus providing additional degrees of freedom. Candidate waveforms can include sinusoidal signals, or waveforms composed of OFDM symbols generated by the complementary codes as described herein above. The target output can also be a previously transmitted signal with low PAPR. The advantage of this latter target function is that it is more "realistic" in the sense that a symbol was already generated with the set of data provided. It will be appreciated that the target output can be a fixed target that is defined and pre-programmed in advance, as when using a sinusoidal waveform or waveforms composed of OFDM symbols generated by the complementary codes. Alternatively, the target output can be determined dynamically "on the fly," as when utilizing a previously transmitted signal with a low PAPR.

We may now formulate the problem. Let $f \in C$ be the complex target output of the IDFT process having the properties just stated, and $g \in C$ be the approximating complex output. Given the distance metric $\zeta$, we determine the approximation $\hat{g}$ such that $$\zeta[f,\hat{g}] \leq \zeta[f,g] \qquad (5)$$

The distance function $\zeta$ can be a norm $\|\cdot\|$ satisfying the well-known norm axioms, with the following basic (vector) norms considered:

1. Absolute norm:

$$\|v\|_1 = |v_1| + |v_2| + \cdots + |v_n| = \sum_{i=1}^{n} |v_i|$$

2. Euclidean norm:

$$\|v\|_2 = (|v_1|^2 + |v_2|^2 + \cdots + |v_n|^2)^{1/2} = \left[\sum_{i=1}^{n} v_i^2\right]^{1/2}$$

3. Supremum (Maximum) norm: $\|v\|_\infty = \max_{1 \leq i \leq n} |v_i|$.

The preceding norms have bearing on the peak-to-average calculations because equation (1) can be rewritten as $$PAPR = \frac{\|f\|_\infty^2}{\|f\|_2^2} \qquad (6)$$

The approximation can proceed through standard techniques. We consider here the minimization of the absolute error for each symbol, i.e., $$\|\hat{g} - f\|_1 = \|e\|_1 = \text{minimum} \qquad (7)$$

where e is the complex error. The absolute error is a worst-case error since it is the sum of the absolute values of the errors at each point. As such, the absolute error is an upper bound for the other possible errors:

$$\|\hat{g} - f\|_1 \geq \|\hat{g} - f\|_2, \|\hat{g} - f\|_1 \geq \|\hat{g} - f\|_\infty \qquad (8)$$

From equation (7) and the bounds of equation (8) we may write $$\|\hat{g}\|_\infty = \|f + e\|_\infty \leq \|f\|_\infty + \|e\|_\infty \leq \|f\|_\infty + \|e\|_1 \qquad (9)$$

If we divide both sides by the mean $\|f\|_2$, then we obtain $$\frac{\|\hat{g}\|_\infty^2}{\|f\|_2^2} \leq (PAPR + Y)^2 \qquad (10)$$

where $$PAPR = \frac{\|f\|_\infty^2}{\|f\|_2^2} \qquad (11)$$

is the PAPR of the target signal and $Y = \|e\|_1 / \|f\|_2$ corresponds to the potential PAPR growth due to the approximation $\hat{g}$.

If we consider a scale of means as $\|\hat{g}\|_2 = \alpha \|f\|_2$, then the final result is $$\frac{\|\hat{g}\|_\infty^2}{\|\hat{g}\|_2^2} \leq \frac{1}{\alpha^2} (PAPR + Y)^2 \qquad (12)$$

This is a strict upper bound on the PAPR growth of the output signal $\hat{g}$ based on the target signal f.

The minimization of equation (7) results in a reduction in equation (12). However, from equation (12) we can achieve the minimization through two distinct approaches:

1. Minimize $Y = \|e\|_1 / \|f\|_2$, and/or
2. Maximize $\alpha$ so that $\|\hat{g}\|_2 = \alpha \|f\|_2 = \text{maximum}$.

Therefore, criterion of equation (7) results in two approaches for performing the approximation to the low PAPR target f. It is important to note that, as a matter of design choice, either or both of the above criteria can be utilized to facilitate the minimization of PAPR.

Considering the criteria just stated, if α<1, there will always be PAPR growth since PAPR≧0. Therefore, the preferred approach is to employ an approximation that increases the average, thereby making α>1. This results in a larger denominator that reduces the additive PAPR growth.

The selection of f will result in different outputs ĝ even given the same data. Hence, f can serve as another layer of security on the signal for allowing randomization on the target output. Combined with possible randomization of the subcarriers dedicated to the side information, it is possible to provide an additional layer of security to the OFDM transmission with only a slight overhead in side information to include which target output was selected in the set of all available target outputs.

We will now disclose several embodiments for implementing the PAPR reduction techniques described herein above. Referring to FIG. 1, an electrical block diagram of an exemplary embodiment of a peak-to-average power ratio (PAPR) reduction apparatus 100 comprises a conventional input buffer 102 for storing an original frequency-domain input vector received at an input 116 for generating a next OFDM transmit symbol, the input vector comprising a plurality of elements, as described herein above. The apparatus 100 further comprises a reorderer 104, coupled to the input buffer 102, arranged to apply a reordering to the plurality of elements in a predetermined manner to create a plurality of candidate input vectors. Preferably, the reorderer performs the reordering in a first manner disclosed in equation 3. Alternatively, the reorderer can perform the reordering in a second manner disclosed in equation 4. Both the first and second reordering manners advantageously allow for reduced computational complexity through a circular convolution technique when performing an inverse Fourier transform to obtain an OFDM output.

The apparatus 100 also includes a Fourier processor 108, coupled to the reorderer 104, programmed to perform an inverse Fourier transform, preferably an inverse fast Fourier transform (IFFT) implemented through well-known techniques, on the plurality of candidate input vectors to obtain a corresponding plurality of approximating OFDM outputs. The apparatus 100 further comprises a target definer 112 for defining a target output signal having predetermined properties including an acceptably low PAPR. In addition, the apparatus 100 includes a comparator 114, coupled to the target definer 112 and coupled to the Fourier processor 108, for comparing samples of each of the plurality of approximating OFDM outputs with corresponding samples of the target output signal. In some embodiments, the target definer 112 can also be coupled to the Fourier processor 108 through the path 120 for receiving an output therefrom.

The apparatus 100 further comprises an output selector 110, coupled to the comparator 114, arranged to choose a desired output signal from the plurality of approximating OFDM outputs, in response to a comparison of said samples. After choosing the desired output signal, the output selector 110 then couples the desired output signal onto the apparatus output 118. In some embodiments, the output selector 110 can also be coupled to the Fourier processor 108 for receiving an output directly therefrom. The apparatus 100 also includes a side information inserter 106, coupled to the Fourier processor 108, arranged to insert side information descriptive of the reordering applied to the plurality of elements, the side information sufficient to enable recovery of the original frequency-domain input vector by a receiver. For example, when the rotation technique depicted in equation (3) is utilized to reorder the elements of the input vector, the side information simply identifies the number of rotations used to produce the selected output. The receiver can then decode the received data and perform the same number of rotations in reverse to recover the original input vector. In one embodiment, the side information inserter 106 is also coupled to the reorderer 104 through the path 122 for receiving an input therefrom. Alternatively, the side information inserter 106 can be coupled to the output selector 110 through the path 124 for receiving an input therefrom. The latter coupling is useful when the apparatus 100 employs the circular convolution computational complexity reduction technique described herein above.

Figure 2:
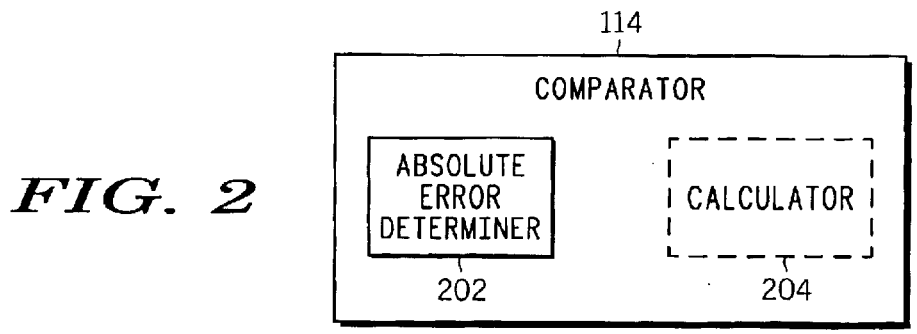
FIG. 2 is an electrical block diagram depicting an exemplary comparator.

Referring to FIG. 2, an electrical block diagram depicts exemplary embodiments of the comparator 114. The first embodiment of the comparator 114 comprises an absolute error determiner 202 for determining an absolute error between samples of each of said plurality of approximating OFDM outputs and corresponding samples of said target output signal. In the first embodiment, the absolute error determiner 202 calculates the absolute error preferably in accordance with equation 7.

The second embodiment of the comparator 114 comprises a calculator 204 for calculating a value representing an average power of each of said plurality of approximating OFDM outputs. In this embodiment, the calculator 204 preferably calculates the value representing average power as the square of the Euclidean norm of each of the OFDM outputs.

Figure 3:
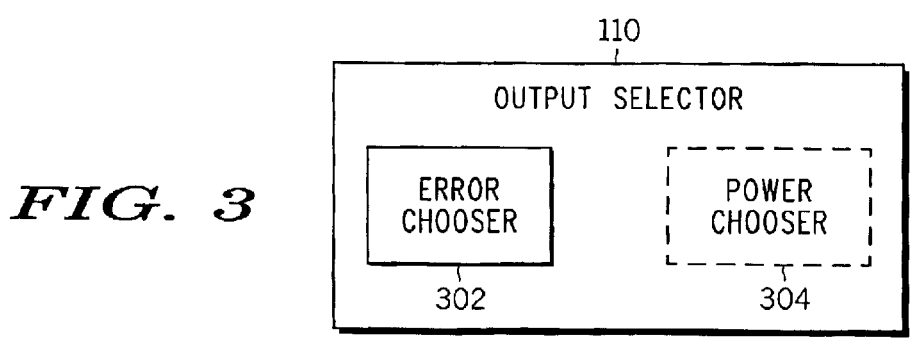
FIG. 3 is an electrical block diagram depicting an exemplary output selector.

Referring to FIG. 3, an electrical block diagram depicts exemplary embodiments of the output selector 110. The first embodiment of the output selector 110 comprises an error chooser 302 arranged to choose as the desired output one of the plurality of approximating OFDM outputs producing a total absolute error smaller than any other of the plurality of approximating OFDM outputs or sufficiently small to satisfy a predetermined error threshold where this threshold may be selected experimentally or such that the candidate desired output was within a certain percentage of the target output signal. This embodiment is intended to work in conjunction with the first embodiment of the comparator 114.

The second embodiment of the output selector 110 comprises a power chooser 304 arranged to choose as the desired output one of the plurality of approximating OFDM outputs having an average power larger than any other of the plurality of approximating OFDM outputs or at least large enough to satisfy a power threshold where the threshold is experimentally determined or determined to be within a certain percentage of the target output signal power. This embodiment is intended to work in conjunction with the second embodiment of the comparator 114.

Figure 4:
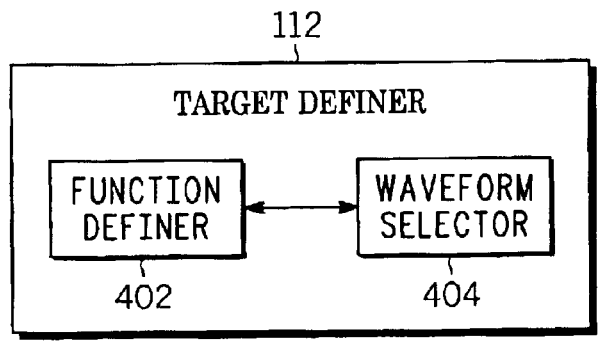
FIG. 4 is an electrical block diagram of an exemplary embodiment of a target definer.

Referring to FIG. 4, an electrical block diagram of an exemplary embodiment of the target definer 112 comprises a function definer 402 for defining a function that is periodic over a window in which the PAPR is specified, said window having edges; and the function being smooth, such that no large peaks occur near the edges of said window, e.g., no peaks larger than 10×log(N), where N is the number of subcarriers of the OFDM transmission.

The target definer 112 further comprises a waveform selector 404 arranged to select a waveform from a group of waveforms consisting of a sinusoidal signal, a waveform comprising OFDM signals generated by complementary codes, and a previously transmitted OFDM signal having a PAPR below a predetermined threshold, such as for example 2. Together, the function definer 402 and the waveform selector 404 cooperate to define a target signal that satisfies the desired selection criteria. It will be appreciated that the target definer 112 can be programmed, e.g., by a user or manufacturer, to modify the selection criteria.

Figure 5:
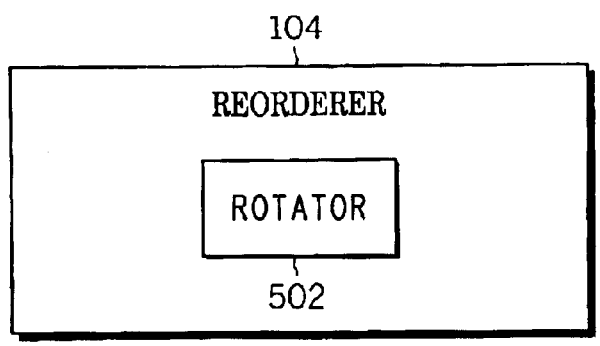
FIG. 5 is an electrical block diagram of a first exemplary embodiment of a reorderer.

Referring to FIG. 5, an electrical block diagram of a first exemplary embodiment 500 of the reorderer 104 comprises a rotator 502 arranged to perform a rotation of the input vector to form a circulant matrix, as depicted in equation (3). The circulant matrix allows the Fourier processor 108 to be programmed to perform a circular convolution on the circulant matrix through well-known techniques, thereby advantageously reducing computational complexity.

Figure 6:
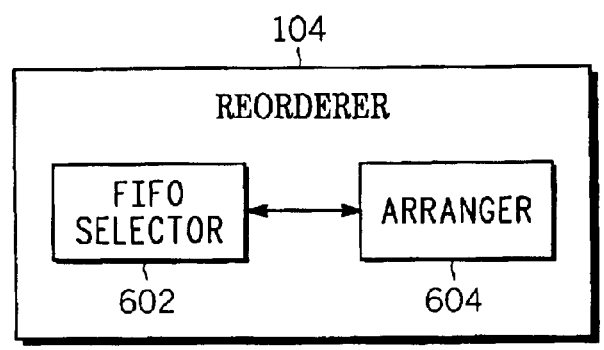
FIG. 6 is an electrical block diagram of a second exemplary embodiment of a reorderer.

Referring to FIG. 6, an electrical block diagram of a second exemplary embodiment 600 of the reorderer 104 comprises a FIFO selector 602 arranged to select a plurality of contiguous portions of said plurality of elements, each of said contiguous portions shifted with respect to all other portions while maintaining first-in-first-out (FIFO) order, to form said plurality of candidate input vectors. The second embodiment 600 of the reorderer 104 further comprises an arranger 604, coupled to the FIFO selector 602, for arranging the plurality of candidate input vectors to form a Toeplitz structure, as depicted in equation (4). The Toeplitz structure also allows the Fourier processor 108 to be programmed to perform a circular convolution on the circulant matrix through well-known techniques, thereby advantageously reducing computational complexity. In addition, the FIFO order advantageously does not interfere with interleaving in systems which utilize interleaving for error reduction.

Figure 7:
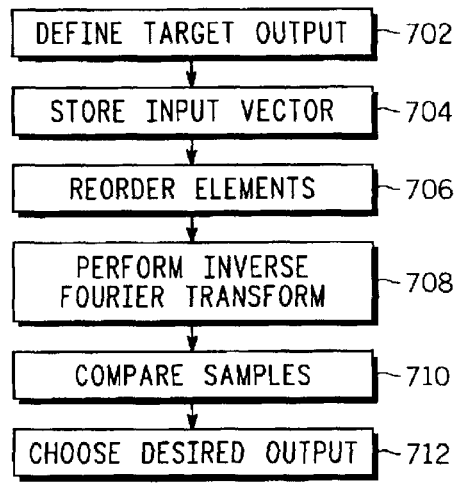
FIG. 7 is a flow chart depicting operation of the apparatus for reducing a peak-to-average power ratio.

Referring to FIG. 7, a flow chart 700 depicting operation of the PAPR reduction apparatus begins with the target definer 112 defining 702 a target output, as disclosed herein above. The input buffer 102 then receives and stores 704 an input data vector. The reorderer 104 reorders 706 the elements of the input vector to create a plurality of candidate input vectors, as disclosed herein above. The Fourier processor 108 then performs 708 an inverse Fourier transform, through well-known techniques, on the plurality of candidate input vectors to obtain a corresponding plurality of approximating OFDM outputs. The comparator 114 then compares 710 samples of each of the plurality of approximating OFDM outputs with corresponding samples of said target output signal, preferably to calculate the error and to determine the average power of the approximating OFDM output. The output selector 110 then chooses 712 a desired output signal from the plurality of approximating OFDM outputs, in response to comparing the samples in accordance with selection criteria of sufficiently reducing and preferably minimizing the error and sufficiently increasing and preferably maximizing the average power. It will be appreciated that, alternatively, a single one of reducing or minimizing the error and increasing or maximizing the average power can be utilized as well for the selection criterion.

Figure 8:
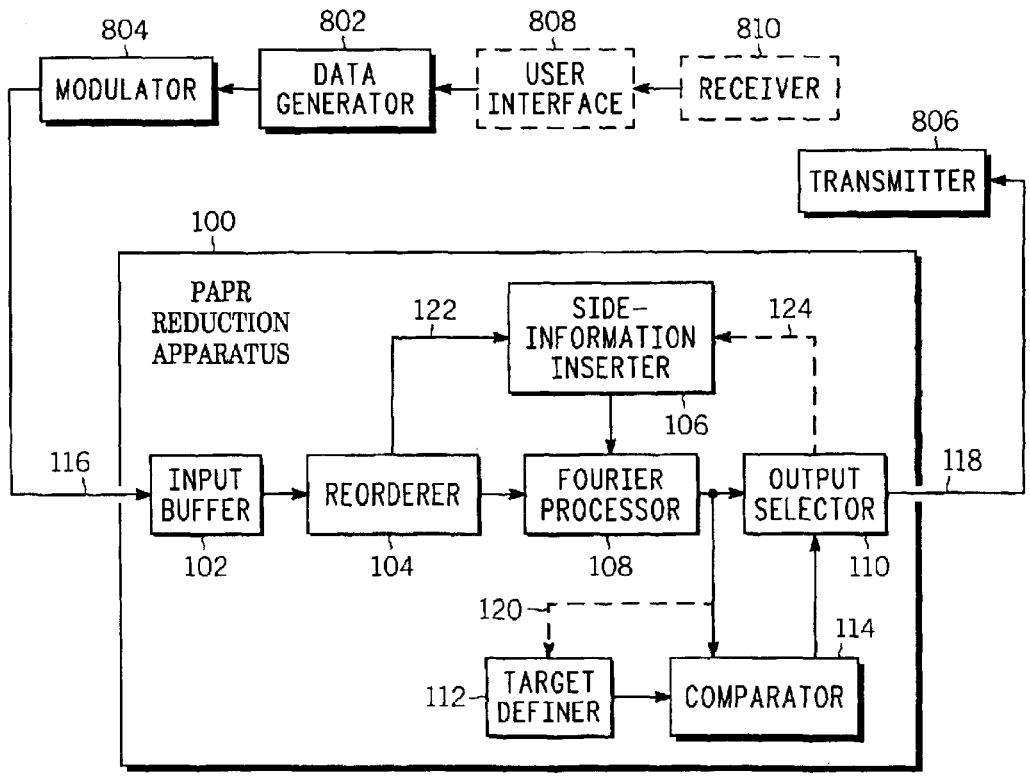
FIG. 8 is an electrical block diagram of an exemplary embodiment of a wireless communication device.

Referring to FIG. 8, an electrical block diagram of an exemplary embodiment of a wireless communication device 800 for reducing a peak-to-average power ratio (PAPR) in an orthogonal frequency division multiplex (OFDM) signal comprises a conventional data generator 802 for generating an input data stream. The device 800 further comprises a modulator 804, coupled to the data generator, modulating the input data stream to produce an original frequency-domain input vector for generating a next OFDM transmit symbol. The device 800 further comprises the PAPR reduction apparatus 100, whose input 116 is coupled to the modulator for receiving the frequency-domain input vector. The device 800 also includes a transmitter 806, coupled to the output 118 of the apparatus 100 for transmitting the desired output signal. In some embodiments, the device 800 may include a conventional receiver 810 for adding two-way capability to the device 800, as well as a conventional user interface 808 comprising, for example, a display, control buttons, audio transducers and an alerting device.

Thus, it should be clear from the preceding disclosure that the present invention provides a method and apparatus for reducing the peak-to-average power ratio (PAPR) in an orthogonal frequency division multiplex (OFDM) signal. Advantageously, at least one of the embodiments depicted can reduce the PAPR substantially, while minimizing the computational complexity required to achieve the reduction. One of ordinary skill in the art will recognize the technique disclosed herein is general and can be implemented with many degrees of freedom. For example, the reordering of the elements of the input vector to create a plurality of candidate input vectors can be performed in virtually any manner desired, including random or pseudo-random manners. The reordering is by no means restricted to the simple rotations and shifts described in the preferred embodiments. Furthermore, the desired output can be selected by (a) minimizing the error between the approximating output and the target output signal, (b) maximizing the average power of the approximating output, or (c) a combination of both (a) and (b).

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for reducing a peak-to-average power ratio (PAPR) in an orthogonal frequency division multiplex (OFDM) signal, the method comprising:

reordering a plurality of elements of an original frequency-domain input vector in a predetermined manner to create a plurality of candidate input vectors;

performing an inverse Fourier transform on said plurality of candidate input vectors to obtain a corresponding plurality of approximating OFDM outputs;

comparing samples of each of said plurality of approximating OFDM outputs with corresponding samples of a target output signal having an acceptably low PAPR; and choosing, responsive to said comparing said samples, a desired output signal from said plurality of approximating OFDM outputs, said desired output signal corresponding to a next OFDM transmit symbol.

2. The method of claim 1, further comprising inserting side information descriptive of said reordering, said side information sufficient to enable recovery of said original frequency-domain input vector by a receiver.

3. The method of claim 1, wherein said comparing samples of each of said plurality of approximating OFDM outputs comprises determining an absolute error between samples of each of said plurality of approximating OFDM outputs and corresponding samples of said target output signal, and said choosing said desired output comprises choosing one of said plurality of approximating OFDM outputs producing a total absolute error smaller than any other of said plurality of approximating OFDM outputs.

4. The method of claim 1, wherein
said comparing samples of each of said plurality of approximating OFDM outputs comprises calculating a value representing an average power of each of said plurality of approximating OFDM outputs; and
said choosing said desired output comprises choosing one of said plurality of approximating OFDM outputs having an average power larger than any other of said plurality of approximating OFDM outputs.

5. The method of claim 1, further comprising defining a target output signal including:
defining a function that is periodic over a window in which the PAPR is specified, said window having edges; and
further defining a function that is smooth, such that no large peaks occur near the edges of said window.

6. The method of claim 1, further comprising defining a target output signal by selecting a waveform from a group of waveforms consisting of:
a sinusoidal signal,
a waveform comprising OFDM signals generated by complementary codes, and
a previously transmitted OFDM signal having a PAPR below a predetermined threshold.

7. The method of claim 1, wherein
said reordering said plurality of elements comprises a rotation of said input vector to form a circulant matrix, and
said performing an inverse Fourier transform comprises performing a circular convolution.

8. The method of claim 1, wherein reordering said plurality of elements comprises selecting a plurality of contiguous portions of said plurality of elements, each of said contiguous portions shifted with respect to all other portions while maintaining a first-in-first-out order, to form said plurality of candidate input vectors.

9. The method of claim 8, wherein
said reordering said plurality of elements further comprises the step of arranging said plurality of candidate input vectors to form a Toeplitz structure, and
said performing said inverse Fourier transform comprises performing a circular convolution on said Toeplitz structure.

10. An apparatus for reducing a peak-to-average power ratio (PAPR) in an orthogonal frequency division multiplex (OFDM) signal, the apparatus comprising:
a target definer for defining a target output signal having predetermined properties including an acceptably low PAPR;
a reorderer arranged to apply a reordering to a plurality of elements of an original frequency-domain input vector in a predetermined manner to create a plurality of candidate input vectors;
a Fourier processor, coupled to the reorderer, programmed to perform an inverse Fourier transform on said plurality of candidate input vectors to obtain a corresponding plurality of approximating OFDM outputs;
a comparator, coupled to said target definer and coupled to said Fourier processor, for comparing samples of each of said plurality of approximating OFDM outputs with corresponding samples of said target output signal; and
an output selector, coupled to said comparator, arranged to choose a desired output signal corresponding to a next OFDM transmit symbol from said plurality of approximating OFDM outputs, in response to a comparison of said samples.

11. The apparatus of claim 10, further comprising
a side-information inserter, coupled to said Fourier processor, arranged to insert side information descriptive of said reordering applied to said plurality of elements, said side information sufficient to enable recovery of said original frequency-domain input vector by a receiver.

12. The apparatus of claim 10, wherein
said comparator comprises an absolute error determiner for determining an absolute error between samples of each of said plurality of approximating OFDM outputs and corresponding samples of said target output signal, and
said output selector comprises an error chooser arranged to choose one of said plurality of approximating OFDM outputs producing a total absolute error smaller than any other of said plurality of approximating OFDM outputs.

13. The apparatus of claim 10, wherein
said comparator comprises a calculator for calculating a value representing an average power of each of said plurality of approximating OFDM outputs; and
said output selector comprises a power chooser arranged to choose one of said plurality of approximating OFDM outputs having an average power larger than any other of said plurality of approximating OFDM outputs.

14. The apparatus of claim 10, wherein said target definer comprises:
a function definer for defining a function that is periodic over a window in which the PAPR is specified, said window having edges; and that is smooth, such that no large peaks occur near the edges of said window.

15. The apparatus of claim 10, wherein said target definer comprises a waveform selector arranged to select a waveform from a group of waveforms consisting of:
a sinusoidal signal,
a waveform comprising OFDM signals generated by complementary codes, and
a previously transmitted OFDM signal having a PAPR below a predetermined threshold.

16. The apparatus of claim 10, wherein
said reorderer comprises a rotator arranged to perform a rotation of said input vector to form a circulant matrix, and
said Fourier processor is programmed to perform a circular convolution on said circulant matrix.

17. The apparatus of claim 10, wherein said reorderer comprises
a FIFO selector arranged to select a plurality of contiguous portions of said plurality of elements, each of said contiguous portions shifted with respect to all other portions while maintaining first-in-first-out (FIFO) order, to form said plurality of candidate input vectors.

18. The apparatus of claim 17, wherein
said reorderer comprises an arranger, coupled to said FIFO selector, for arranging said plurality of candidate input vectors to form a Toeplitz structure, and
said Fourier processor is programmed to perform a circular convolution on said Toeplitz structure .

19. A wireless communication device arranged and constructed for reducing a peak-to-average power ratio (PAPR)

in an orthogonal frequency division multiplex (OFDM) signal, the wireless communication device comprising:

a modulator arranged to modulate an input data stream to produce an original frequency-domain input vector having a plurality of elements for in generating a corresponding next OFDM transmit symbol;

a reorderer, coupled to said modulator, arranged to apply a reordering to said plurality of elements in a predetermined manner to create a plurality of candidate input vectors;

a Fourier processor, coupled to the reorderer and programmed to perform an inverse Fourier transform on said plurality of candidate input vectors to obtain a corresponding plurality of approximating OFDM outputs;

a comparator, coupled to said Fourier processor, for comparing samples of each of said plurality of approximating OFDM outputs with corresponding samples of a target output signal having an acceptable PAPR;

an output selector, coupled to said comparator, arranged to choose a desired output signal from said plurality of approximating OFDM outputs, in response to a comparison of said samples, and a transmitter, coupled to said output selector, for transmitting said desired output signal as said next OFDM transmit symbol.

20. The wireless communication device of claim 19, further comprising a side-information inserter, coupled to said Fourier processor, arranged to insert side information descriptive of said reordering applied to said plurality of elements, said side information sufficient to enable recovery of said original frequency-domain input vector by a receiver.

21. The wireless communication device of claim 19, wherein said comparator comprises an absolute error determiner for determining an absolute error between samples of each of said plurality of approximating OFDM outputs and corresponding samples of said target output signal, and said output selector comprises an error chooser arranged to choose one of said plurality of approximating OFDM outputs producing a total absolute error smaller than one of any other of said plurality of approximating OFDM outputs and a predetermined error threshold.

22. The wireless communication device of claim 19, wherein said comparator comprises a calculator for calculating a value representing an average power of each of said plurality of approximating OFDM outputs; and said output selector comprises a power chooser arranged to choose one of said plurality of approximating OFDM outputs having an average power larger than one of any other of said plurality of approximating OFDM outputs and a predetermined power threshold.

23. The wireless communication device of claim 19, further including a function definer for defining said target output signal to be periodic over a window in which the PAPR is specified, said window having edges; said target output signal being smooth, such that no large peaks occur near the edges of said window.

24. The wireless communication device of claim 23, wherein said function definer comprises a waveform selector arranged to select as said target output signal a waveform from a group of waveforms consisting of:

a sinusoidal signal, a waveform comprising OFDM signals generated by complementary codes, and a previously transmitted OFDM signal having a PAPR below a predetermined threshold.

* * * * *